Figure 1:
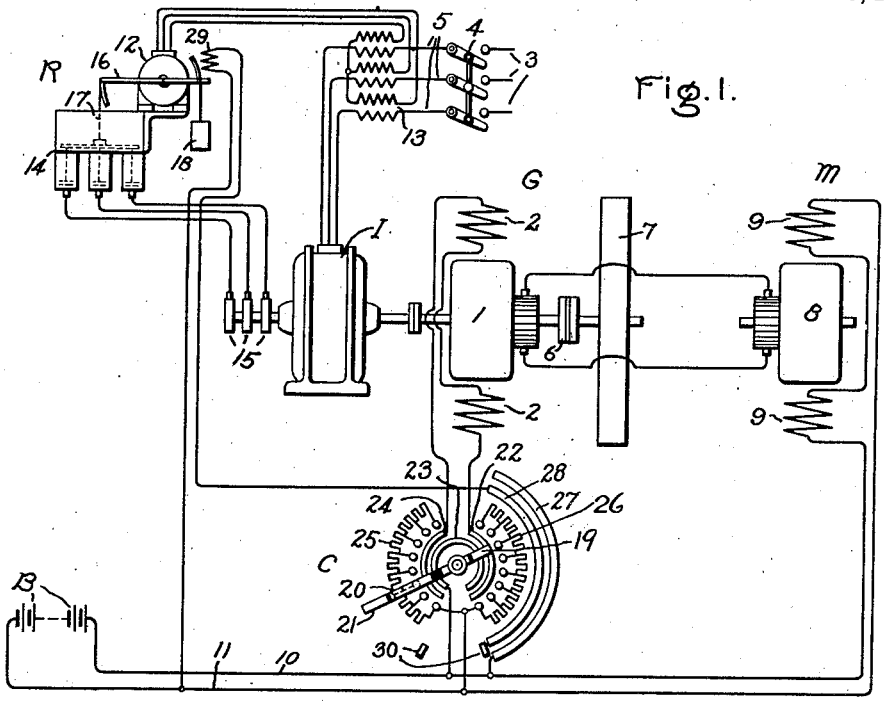

M. A. WHITING.
SYSTEM OF TRANSMISSION.
APPLICATION FILED JUNE 13, 1917.

1,297,953.

Patented Mar. 18, 1919.

Inventor:
Max A. Whiting,
by [signature]
His Attorney.

UNITED STATES PATENT OFFICE.

MAX A. WHITING, OF SCHENECTADY, NEW YORK, ASSIGNOR TO GENERAL ELECTRIC COMPANY, A CORPORATION OF NEW YORK.

SYSTEM OF TRANSMISSION.

1,297,953.  Specification of Letters Patent.  Patented Mar. 18, 1919.

Application filed June 13, 1917. Serial No. 174,604.

*To all whom it may concern:*

Be it known that I, MAX A. WHITING, a citizen of the United States, residing at Schenectady, in the county of Schenectady, State of New York, have invented certain new and useful Improvements in Systems of Transmission, of which the following is a specification.

My invention relates to transmission systems, and more particularly to systems of transmission in which a hoist, or other motor is electrically operated from a fly-wheel motor-generator set.

A transmission system in which a direct current hoist motor is electrically connected to, and adapted to be operated from, a fly-wheel motor-generator set, which comprises direct connected induction motor, direct current generator and fly wheel, is already well known. Furthermore automatic means for increasing the resistance in circuit with the induction motor secondary, and hence the slip thereof when the current demanded by the induction motor exceeds a predetermined amount, have hitherto been employed.

If, during certain periods of the operation of the system an unbalance of the mechanical load connected to the hoist motor causes it to operate as a generator, energy will be transferred from said motor to the motor-generator set. If the amount of energy thus transferred be sufficient to overcome the various losses of the set, the latter will be caused to run at a speed greater than the induction motor synchronous speed, providing such transfer of energy be continued for a sufficient time to accelerate the motor-generator set and direct connected fly-wheel, and the induction motor will return energy to the supply circuit from which it is normally driven.

If, however, the regenerated current exceed a predetermined amount, the automatic means hereinbefore referred to will increase the resistance in circuit with the induction motor secondary and hence will increase the slip thereof. Whereas ordinarily an increase in slip causes a decrease in speed, an increase in slip of an induction motor when regenerating, as in this case, causes an increase in speed, and hence permits the set to speed up. The counter electromotive-force developed in the generator of the motor-generator set, now operating as a motor which increases with the speed tends in an increasing degree to diminish the electrical power delivered thereto by the hoist motor, now operating as a generator, and the latter will consequently speed up due to the continuing driving action of the unbalanced mechanical load connected thereto.

One object of my invention is to prevent this unstable condition in a system of the kind described, and particularly to overcome the tendency of the motor-generator, or equivalent set and consequently of the hoist or other motor, which is directly associated with an unbalanced mechanical load, to increase unduly in speed in response to the current flowing between the induction motor of said motor-generator set, operating as a generator, and the supply circuit, when energy is being returned to said circuit.

Another object of my invention is to provide means in a system of the kind above referred to whereby the operation of the automatic current-responsive means for varying the resistance of the induction motor secondary circuit is rendered ineffective to increase the resistance in circuit with the secondary of the induction motor during the regenerating operation thereof.

Another object of my invention is to provide an induction motor which is adapted to operate either as a motor or as a generator with means adapted during the motoring operation to vary the resistance in circuit with the induction motor secondary and hence the slip of the induction motor in accordance with variations of current traversing the primary of said motor and for maintaining the resistance and consequently the slip at a minimum value during the generating operation.

Figure 2:
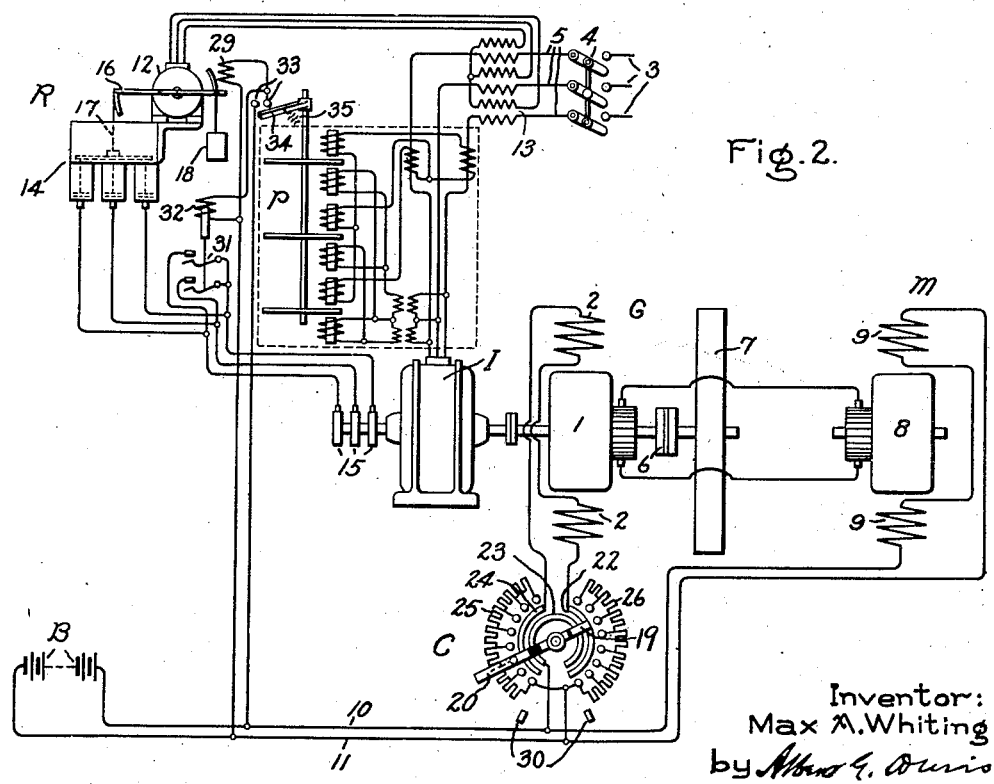

The manner in which my invention accomplishes its intended purpose may be more readily explained by reference to the accompanying drawings in which Figure 1 is a diagrammatic showing of one modification of my invention which is adapted to a system in whch the unbalance of the mechanical load connected to the motor always acts in a single direction, and at times is allowed to overhaul the motor in a single direction, and Fig. 2 is a diagrammatic showing of a modification of my invention which is adapted either to a system in which the unbalance of the mechanical load connected to the motor, always acts in a single direction and tends to rotate the motor in a single direction, as in the system to which the modification of Fig. 1 is applicable, or to a system in which the unbalance of the mechanical load connected to the motor may act from time to time in either direction, and may from time to time be allowed to overhaul the motor in either direction of rotation.

Similar parts are designated by the same reference characters in both figures. The systems, in so far as they are identical in the two figures, will first be described.

Referring to the drawings, G, represents a dynamo electric machine, hereinafter referred to as a dynamo, adapted to operate either as a generator or as a motor, and having an armature 1 and a field winding 2. An induction motor I, supplied with power from the alternating current supply mains 3 by means of switch 4 and conductors 5, is coupled to the dynamo G. Connected to said dynamo G, by means of the coupling 6 is a fly-wheel 7.

M represents a dynamo electric machine, hereinafter referred to as a dynamo, adapted to operate either as a motor or as a generator, and having an armature 8, electrically connected to the armature 1 of the dynamo G, and a field winding 9. The field windings 2 and 9 may be excited from any suitable source of current having substantially uniform voltage, and, according to the drawings, this source is represented as a storage battery B. The storage battery B supplies current to the conductors 10, 11, to which the field winding 9 of the dynamo M, as illustrated, is directly connected and to which the field winding 2 of the dynamo G is connected through the controller C.

The controller C is adapted to varying the resistance in circuit with the field winding 2 and also the direction of the current flow through said winding.

R represents an automatic rheostat or slip regulator, which is adapted to automatically cut resistance into or out of the secondary circuit of the induction motor I. This slip regulator comprises a slip regulating or "torque" motor 12, supplied with current directly proportional to the current in the conductors 5, by means of series transformers 13 which are inserted in the conductors 5, and a liquid rheostat 14 electrically connected to the slip rings 15 of the induction motor secondary. The plates of the liquid rheostat are adapted to be separated or brought together, the movable plates being connected to and controlled by the torque motor 12 through the lever 16 and the connection 17. A counterweight 18 is arranged to partially balance the weight of the moving parts of the rheostat. This torque motor is limited in its movement to less than a complete revolution. The slip regulator R and series transformer 13 constitute automatic means, responsive to the current in the alternating current conductors 5, for varying the resistance in the secondary circuit of the induction motor I.

With particular reference to Fig. 1, the controller C is provided with a movable member having the relatively insulated contact members 19, 20 and 21, the first of which is adapted to engage with and electrically connect the arc-shaped contact members 22 and 23, or arc-shaped contact members 23 and 24. The contact member 20 is adapted to engage with and electrically connect the arc-shaped contact member 24 and the taps of the resistance 25, or to engage with and electrically connect the arc-shaped contact member 22 and the taps of the resistance 26. The contact member 21 is adapted, under certain conditions, to electrically connect the arc-shaped contacts 27 and 28. The arc-shaped contact 27 is connected directly to the conductor 10, and the arc-shaped contact 28 is connected to one terminal of the winding of an electromagnet 29, the other terminal of which is connected to the conductor 11. The electromagnet 29 coöperates with the lever 16 of the torque motor 12, and, under certain conditions, holds said lever in the position illustrated in Fig. 1, in which position the resistance of the liquid rheostat is a minimum. Stops 30 limit the travel of the movable member of the controller. The dynamo M is adapted to be connected to an unbalanced hoist or other unbalanced load.

The operation of the system illustrated in Fig. 1 is as follows: Assume that it is desired to operate, or in case the dynamo M is used in connection with a hoist, to raise an unbalanced load, assume the fly-wheel motor-generator set, comprising induction motor I, dynamo G and fly-wheel 7, to be in operation, and assume the movable member of the controller to be in a vertical position with the contact member 19 out of engagement with the arc-shaped contacts 22, 23 and 24. This is the "off" position of the controller. If, now, it be desired to supply energy to the dynamo M to drive it as a motor, the movable member of the controller will be moved in a counter-clockwise direction, in the course of which movement the contact member 20 will engage with the arc-shaped contact member 24 and the taps of the resistance 25 and the contact member 19 will engage with the arc-shaped contact members 22 and 23. Continued movement of said movable member will cause an increase in the current traversing the winding 2 of the dynamo G by removal of the resistance 25. Current will then be supplied by the dynamo G, operating as a generator, to the dynamo M, operating as a motor. In case the current supplied to the induction motor I, during the period in which the dynamo G is driven as a generator thereby, exceeds a predetermined amount the torque motor 12 will be operated to increase the resistance in circuit with the induction motor secondary.

If, now, it be desired to allow the mechanical load to overhaul the dynamo M, for example, in order to lower a load down a mine shaft, this cannot be accomplished with member 20 in any position at the left. If the movable member of the controller be placed in the "off" position, i. e. with 20 and 21 vertically upward, windings 2 will be deënergized. This will usually allow the unbalanced load to overhaul dynamo M, but only at a speed much less than normal. To increase the speed at which the load can overhaul dynamo M, the controller arm will be moved clockwise to a position in which the movable contact 20 engages with the arc-shaped contact 22 and the taps of the resistance 26, and in this position the movable contact 19 will engage with the arc-shaped contacts 23 and 24 and the movable contact 21 will engage and electrically connect the arc-shaped contacts 27 and 28. With the movable member of the controller in this position the field of the dynamo G will have been reversed so that the current generated by the dynamo M, operating as a generator and rotating in a direction opposite to that in which it rotated when operating as a motor, will tend to rotate the dynamo G as a motor in the same direction as that in which it rotated when operating as a generator. If the dynamo M, operating as a generator, continues to deliver energy to the dynamo G, operating as a motor, for a sufficient period the motor-generator set will be accelerated to such a speed that the induction motor I will be caused to function as a generator to return energy to the alternating current supply mains 3. With the movable member of the controller C in the last named position the winding of the electromagnet 29 is energized, and in case the movable parts of the liquid rheostat are in the position illustrated, in which position the resistance in circuit with the induction secondary is a minimum, lever 16 will be under the control of the electromagnet 29 and will be held thereby regardless of the value of the current traversing the induction motor I. In case the movable part of the liquid rheostat and the lever 16 are not in the position illustrated at the time the electromagnet 29 is energized they will assume such position when during the acceleration of the motor-generator set, the energy supplied to the induction motor I from the alternating current supply mains 3 becomes zero and will be subsequently held in such position by the electromagnet 29. It is thus evident that during the motor operation of the induction motor I the slip regulator will be effective to vary the resistance in the secondary thereof and hence the slip, whereas when the induction motor I operates as a generator the slip regulator will be maintained in a condition corresponding to minimum resistance in the induction motor secondary and hence minimum slip.

With particular reference to Fig. 2, the controller C is substantially like the controller C in Fig. 1 except that the movable contact 21 and the arc-shaped contacts 27 and 28 coöperating therewith are omitted and the function thereof is performed by other means. The modification of my invention, as shown in Fig. 2, is adapted for more general application than that shown in Fig. 1 since the mechanical load associated with the dynamo M may be unbalanced in either direction, continuously or alternatively. The dynamo M may be required to operate as a motor in either direction. The dynamo M may also be required to brake when rotating in either direction. In Fig. 2, as in Fig. 1, the torque motor 12 of the slip regulator R is provided with a lever 16 with which the electromagnet 29 is adapted to coöperate in order under certain conditions to hold it in the position illustrated, in which position the resistance of the liquid rheostat is a minimum. A short circuiting switch 31, operated by the electromagnet 32 may be employed to short circuit the secondary of the induction motor. 31 may thus be used as an additional precaution, or 29 may be omitted and 31 alone used. The windings of the electromagnets 29 and 32 are energized from the conductors 10 and 11. The circuits, including the windings of the electromagnets 29 and 32, are controlled by a switch, comprising stationary contacts 33 and movable contact 34, which is operated by reverse power relay P, which is adapted when the induction motor I is operating as a motor to permit the spring 35 to maintain the movable contact 34 out of engagement with the stationary contacts 33 and hence to maintain the circuits of the windings of the electromagnets 29 and 32 open, and when the induction motor I is operating as a generator to cause the movable contact 34 to engage with the stationary contacts 33 and hence to close the circuits including the windings of electromagnets 29 and 32.

The mode of operation of the system of Fig. 2 whereby the dynamo M is caused to operate, either as a motor or as a generator, to control the mechanical load connected thereto is substantially the same as in the system of Fig. 1. When the induction motor I is driven at such speed by means of the dynamo G operating as a motor, that energy is returned to the alternating current mains 3, the reverse power relay P will cause the movable contact 34 to engage with the stationary contacts 33 and hence cause the electromagnets 29 and 31 to be energized. Upon the energization of these electromagnets the short circuiting switch 13 will be operated thereby short circuiting the induction motor secondary, and when the lever 16 returns to the position illustrated it will be held in such position during the subsequent generator operation of the induction motor I. It is therefore evident that by means of the system illustrated in Fig. 2 the secondary of the induction motor I will be short circuited whenever said induction motor operates as a generator to return energy to the alternating current mains 3, regardless of the direction in which the dynamo M is rotated due to the unbalance of the load controlled thereby.

I conceive that various modifications of my invention may be made and I accordingly do not desire to be limited to the exact arrangement herein described and shown, but seek to cover in the appended claims all such modifications and arrangements as fall within the spirit and scope of my invention.

What I claim as new and desire to secure by Letters Patent of the United States, is:

1. The combination with a supply circuit, of an induction motor adapted to be operated as a motor by power derived therefrom or to operate as a generator to deliver power thereto, means responsive to the current traversing said induction motor for varying the slip thereof and means controlled by the generator operation of the induction motor, for rendering said first mentioned means ineffective to vary the slip of the induction motor.

2. The combination with a supply circuit, of an induction motor adapted to be operated as a motor by power derived therefrom or to operate as a generator to deliver power thereto, said induction motor having a phase wound secondary, a resistance in circuit with said secondary, means responsive to the current traversing said induction motor for varying said resistance, and means controlled by the generator operation of the induction motor for rendering said first mentioned means ineffective to vary said resistance.

3. The combination with a supply circuit, of an induction motor adapted to be operated as a motor by power derived therefrom or to operate as a generator to deliver power thereto, said induction motor having a phase wound secondary, a resistance in circuit with said secondary, means responsive to the current traversing said induction motor for varying said resistance, and means controlled by the generator operation of the induction motor for short circuiting said resistance.

4. The combination with a supply circuit, of a load circuit, a motor-generator set, comprising an induction motor, interposed therebetween and adapted to transfer electrical energy from the supply circuit to the load circuit or from the load circuit to the supply circuit, and means, operable only during the motoring operation of said induction motor, for varying the slip thereof.

5. The combination with a supply circuit, of a motor-generator set, comprising an induction motor, connected thereto, a dynamo-electric machine, adapted to operate either as a motor or as a generator, electrically connected to said set, means responsive to the current traversing said induction motor for varying the slip thereof, and means controlled by the generator operation of the induction motor for rendering said first mentioned means ineffective to vary the slip of the induction motor.

6. The combination with a supply circuit, of a dynamo-electric machine adapted to control a mechanical load and to operate either as a motor or as a generator, a motor-generator set, electrically interposed between said circuit and said dynamo-electric machine and adapted to transfer electrical energy either from said circuit to said dynamo-electric machine or from said dynamo-electric machine to said circuit, said motor-generator set comprising an induction motor, having a phase wound secondary and adapted to be connected to said supply circuit, and a dynamo-electric machine, adapted to be connected to said first mentioned dynamo-electric machine, a variable resistance connected in circuit with the secondary of said induction motor, means responsive to the current traversing said induction motor for varying said resistance, and means responsive to the direction of power exchange between said induction motor and supply circuit for controlling the operation of said first mentioned means.

7. The combination with a supply circuit, of a dynamo-electric machine adapted to control a mechanical load and to operate either as a motor or as a generator, a motor-generator set, electrically interposed between said circuit and said dynamo-electric machine and adapted to transfer electrical energy either from said circuit to said dynamo-electric machine or from said dynamo-electric machine to said circuit, said motor-generator set comprising an induction motor, having a phase wound secondary and adapted to be connected to said supply circuit, and a dynamo-electric machine, adapted to be connected to said first mentioned dynamo-electric machine, a variable resistance connected in circuit with the secondary of said induction motor, means responsive to the current traversing said induction motor for varying said resistance, and means for short circuiting said induction motor secondary when it operates as a generator.

8. The combination with a supply circuit, of a dynamo-electric machine adapted to control a mechanical load and to operate either as a motor or as a generator, a flywheel motor-generator set electrically interposed between said circuit and said dynamo-electric machine and adapted to transfer electrical energy either from said circuit to said dynamo-electric machine or from the dynamo-electric machine to said circuit, said fly-wheel motor-generator set comprising an induction motor, having a phase wound secondary and adapted to be connected to said supply circuit, a dynamo-electric machine, adapted to be connected to said first mentioned dynamo-electric machine, and a flywheel, a variable resistance connected in circuit with the secondary of said induction motor, a slip regulator for varying said resistance, short circuiting means for the induction motor secondary, and a reverse power relay for controlling the operation of said slip regulator and said short circuiting means.

In witness whereof, I have hereunto set my hand this 11th day of June, 1917.

MAX A. WHITING.